Figure 1:
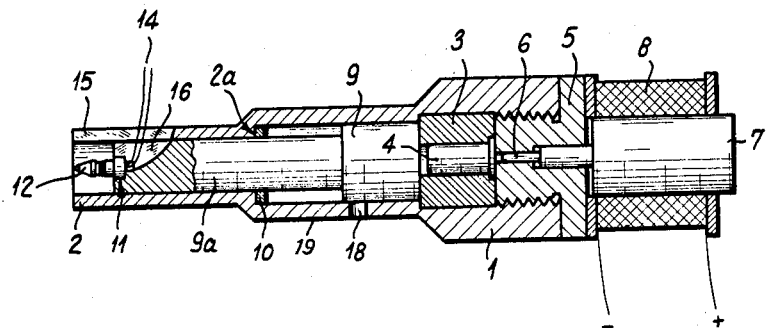

United States Patent Office 3,262,315
Patented July 26, 1966

3,262,315
METHOD OF AND APPARATUS FOR MEASURING THE TEMPERATURE OF A HOT METAL BODY
Benno Lux, Norbert Perlhefter, and Raphaël Nachmias, Carouge, Geneva, Switzerland, assignors to Societe Lorraine de Laminage Continu (Sollac), Societe Anonyme, Paris, France
Filed Apr. 15, 1963, Ser. No. 273,172
Claims priority, application Switzerland, Apr. 19, 1962, 4,818/62
12 Claims. (Cl. 73—343)

This invention concerns the measurement of the temperature of hot metals at or beneath the surface thereof.

Two methods are generally adopted for measuring the surface temperature of hot metals—e.g. steel ingots. One method involves measuring the radiation of the hot metal surface and determining the temperature from the value of such radiation; while the other method involves measuring the temperature by bringing a thermocouple into contact with the metal surface.

The disadvantage of these methods is that they do not measure the temperature of the metal surface, but only the temperature of the oxide layer formed thereon.

The temperature of the oxide layer varies considerably for different reasons so that the surface temperature of the metal determined therefrom is not reliable. To measure exactly the surface temperature of a hot metal, the measurement must therefore be made on the actual metal surface—i.e. under the oxide layer covering such surface. Attempts have therefore been made to bring a thermocouple into contact with the metal surface by placing the two thermocouple elements in a pair of spaced metal prongs which are driven through the oxide layer to come into contact with the metal which provides electrical contact between the two elements of the thermocouple.

It is evident that this method can only be used with very thin oxide layers. For technical reasons it can be applied only with temperatures not exceeding approximately 800° C. and for measurements of very short duration, since the exposed metal surface whose temperature is being measured rapidly oxidises. This method is not suitable for measuring the temperatures of large blocks of metal because of the heat given off thereby.

An object of the present invention is to obviate these disadvantages.

The invention accordingly provides a method of measuring the temperature of a hot metal at or beneath the surface thereof, comprising the step of placing at the desired location a thermocouple by means of at least one projectile driven into the metal body under the effect of an explosive charge.

The thermocouple may be placed at the desired location by means of a single projectile containing both elements of the thermocouple, or by means of two projectiles each containing one element of the thermocouple, or by means of two projecticles with one projectile containing one of the elements of the thermocouple and the other projectile constituting the other element of the thermocouple.

When two projectiles, are used, the latter are preferably driven into the metal beside one another and the metal provides an electric connection between them.

The shape of the projectiles and the location of the thermocouple elements therein can be so chosen that when the projectiles are introduced into the metal the thermocouple elements are positioned where the temperature measurement is to be made—i.e. at the level of the metal surface or beneath this surface, e.g. to a depth of one or several centimetres, and this is a great advantage of the method.

The invention also provides apparatus for carrying the method into effect. This apparatus comprises a gun, and a projectile source of elements adapted for connecting with a hot metal body as elements of a thermocouple, the projectile source of the elements including at least one projectile having a rearward portion, the gun having a piston of limited stroke for transmitting thrust of an explosive detonated by the gun to the rearward portion of the projectile for propelling the projectile a distance into a hot metal body.

Figure 2:
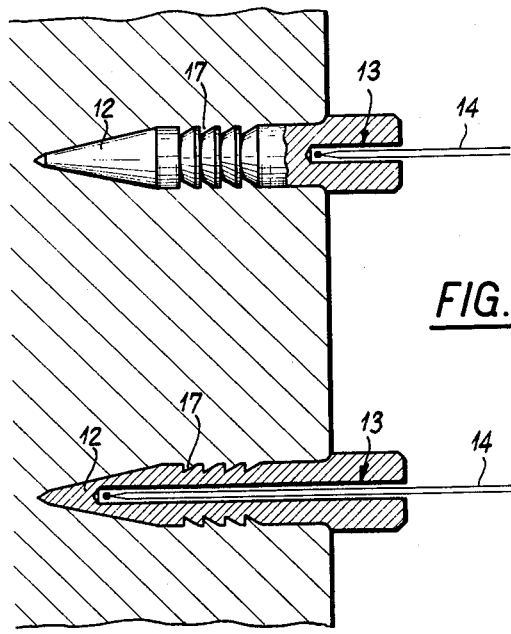

The invention will be described further, by way of example, with reference to the accompanying drawings, wherein:

FIG. 1 is a cross-sectional side elevation showing a preferred form of the apparatus according to the invention; and FIG. 2 is a cross-sectional view showing two thermocouples positioned in a metal block in accordance with the invention.

The apparatus shown in FIG. 1 comprises a gun having a breech 1 and a barrel 2 rigid with an intermediate cylinder 19 having an internal diameter greater than the bore of the barrel to define an internal shoulder 2a. The breech 1 has mounted therein a member 3 for housing a cartridge 4, and a detachable guide 5 for a firing pin 6 which is connected to a magnetic core 7 of an electromagnet 8.

A piston 9 is disposed in the intermediate cylinder 19 in which it travels between the shoulder 2a of the barrel 2 and cartridge housing member 3. A protective washer 10, for instance of mild steel, is disposed between the piston 9 and the shoulder 2a.

The piston 9 has a rod 9a which extends into the barrel 2 and which is formed at its free end with a recess 11 for receiving the rear portion of a projectile 12. The projectile consists of a nail-like member having at the rear thereof an enlarged head fitting into the recess 11 and a hole 13 extending axially into member 12 from the rear end thereof to house a thermocouple 14. The end portion of barrel 2 and the end portion of rod 9a each have an open-ended slot, 15 and 16 respectively (FIG. 1), through which pass the wires of the thermocouple 14.

The middle portion of projectile 12 is formed with circumferential grooves 17 which fix it in the hot metal after its introduction therein (FIG. 2). A gas vent 18 is provided in the wall of cylinder 19 intermediate the ends thereof.

The gun described above operates as follows:

After mounting the projectile 12 in the recess 11 and pushing the piston 9 back against member 3 (the position shown in FIG. 1 of the drawings), the cartridge 4 is introduced into the housing member 3. To this end, the magnetic core 7 is removed together with the firing pin 6 and the guide 5. The latter can be screwed off. After introduction of the cartridge 4, the guide 5 is replaced and the magnetic core 7 is introduced into the electromagnet 8 so that the firing pin 6 partly engages into the guide 5. The electromagnet 8 is connected to a D.C. voltage source (not shown) and the thermocouple 14 is connected to a thermoelectric voltmeter (not shown) respectively.

The loaded gun is placed, by means of a support (not shown) to which it has previously been fixed, in the firing position—i.e. the end of the barrel 2 is placed near or against the hot metal surface whose temperature is to be measured. Current is then supplied to the winding of the electromagnet 8 so that the latter actuates the core 7 inwards and consequently causes the pin 6 to fire the cartridge 4. The piston 9 is then propelled, together with the projectile 12, towards the mouth of the barrel 2. The piston 9 is stopped by the shoulder 2a, while the projectile 12 is driven into the hot metal as shown in FIG. 2. The travel of the piston 9 and the length of the piston rod 9a, are such that the rod end comes to project from the barrel 2 to apply thrust to the projectile as it penetrates into the metal.

The temperature of the zone of the projectile where the thermocouple is positioned very quickly becomes the same as the temperature of the metal, the time required depending on the positioning of the thermocouple in the projectile. For instance, the time is about 20 seconds, when the thermocouple is at the metal surface level (as shown in the upper part of FIG. 2), in a projectile 5 mm. in diameter and 24 mm. in length, and 5 seconds when the thermocouple is near the tip of the projectile—i.e. some distance inside the metal (as shown in the lower part of FIG. 2).

To ensure good penetration of the projectile into the metal the ratio between the diameter and length of the projectile should be between 1:3 and 1:6 and the ratio between the length of the conical tip and the total length of the projectile should be between 1:3 and 1:5.

In the example described above the projectile contains one thermocouple—i.e. the two elements forming such thermocouple. Clearly the arrangement could be modified so that one thermocouple element is contained in one projectile and the second thermocouple element is contained in another projectile; alternatively the other projectile could be formed of such a metal as to form the second element itself. Such separate thermocouple element arrangements are advantageous in cases where measurements have to be made at several places, because the first element of each thermocouple would be contained in individual projectiles while the second element of each thermocouple would be a common element contained in or constituted by a single projectile. In such arrangements where the thermocouple elements are separate, electrical connection between the thermocouple elements is provided by the metal whose temperature is being measured.

A thermocouple relation between the thermocouple elements and the hot metal body therefore is established which not only involves having the elements in thermal relation to the hot metal body, but in electrical interconnection with themselves. The electrical interconnection in certain embodiments, as set forth hereinbefore, may already exist between thermocouple elements of a single projectile before the projectile is propelled to establish additionally the thermal relation and in other embodiments, as noted, the electrical interconnection is made along with establishing thermal relation by propelling several projectiles including the thermocouple elements and relying upon the metal of the hot metal body to interconnect the thermocouple elements electrically.

The projectiles remaining in the hot metal after the measurement need not provide any difficulty since they can be of the same metal as the metal whose temperature is being measured so as to become integral therewith or welded thereto.

We claim:

1. In a method of equipping a hot metal body with a thermocouple having elements in a thermocouple relation to the hot metal body, the art which includes establishing said thermocouple relation of said elements to said hot metal body by propelling and penetrating at least one projectile including said elements into said hot metal body by detonation of an explosive.

2. In the method of claim 1, wherein electrical leads are connected correspondingly with said elements and each of said leads follows the corresponding element when said element is being propelled into said body.

3. In the method of claim 1, wherein a single said projectile includes said thermocouple having said elements.

4. In the method of claim 1, wherein at least one said projectile has external fins and said fins penetrate into said hot metal body while the projectile is being propelled.

5. In the method of claim 1, wherein at least one said projectile has a diameter to length ratio in the range of from 1:3 to 1:6.

6. In the method of claim 1, wherein at least one said projectile has a ratio of length of a front conical portion of the projectile to overall length of the projectile in the range of from 1:3 to 1:5.

7. In the method of claim 1, wherein at least one said projectile is of nail-like form having a head trailing in the direction in which the projectile is propelled.

8. In the method of claim 1, wherein said hot metal body has a surface oxide layer and said elements connected in said thermocouple relation with said body extend through said layer.

9. In the method of claim 1, wherein two of said projectiles include said elements, and with said projectiles penetrated into said hot metal body said elements have juncture through metal of said body.

10. In the method of claim 1, wherein two said projectiles each contains one of said elements and with said projectiles penetrated into said hot metal body said elements have juncture through metal of said body.

11. In the method of claim 1, wherein said elements are included by two said projectiles, one said projectile containing one of said elements and the other said projectile constituting the other said element, and with said projectiles penetrated into said hot metal body said elements have juncture through metal of said body.

12. In the method of claim 1, wherein a single said projectile contains two of said elements interconnected as elements of said thermocouple.

References Cited by the Examiner

UNITED STATES PATENTS

| | | | |
|---|---|---|---|
| 2,861,454 | 11/1958 | Rahlson | 73—352 |
| 2,916,915 | 12/1959 | Burgert | 73—352 |
| 2,930,042 | 3/1960 | Temple et al. | 227—10 |
| 3,129,429 | 4/1964 | Hilti | 227—10 |

LOUIS R. PRINCE, *Primary Examiner.*

D. M. YASICH, *Assistant Examiner.*